Jan. 30, 1951     H. POLLARD ET AL     2,539,970
SAFETY CONTROL FOR HYDRAULIC BRAKE SYSTEMS
Filed March 11, 1948
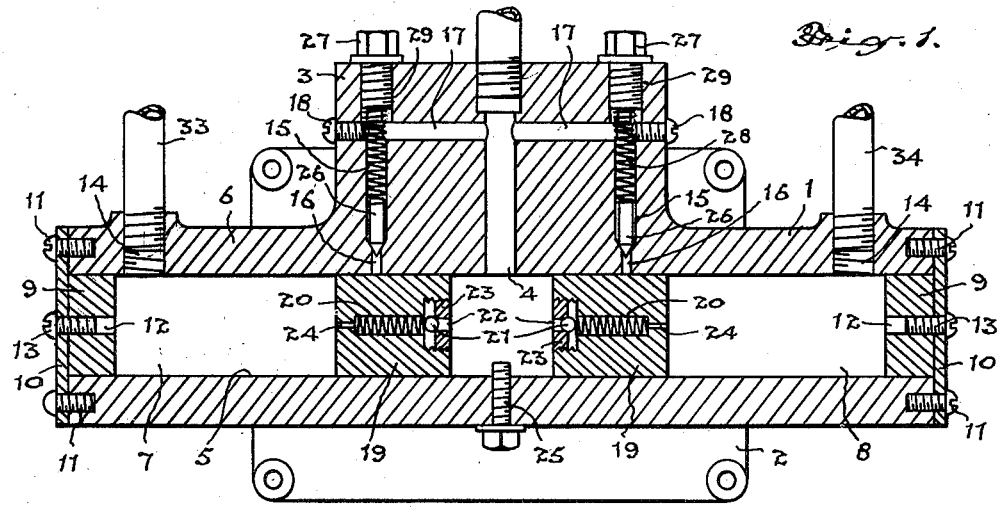
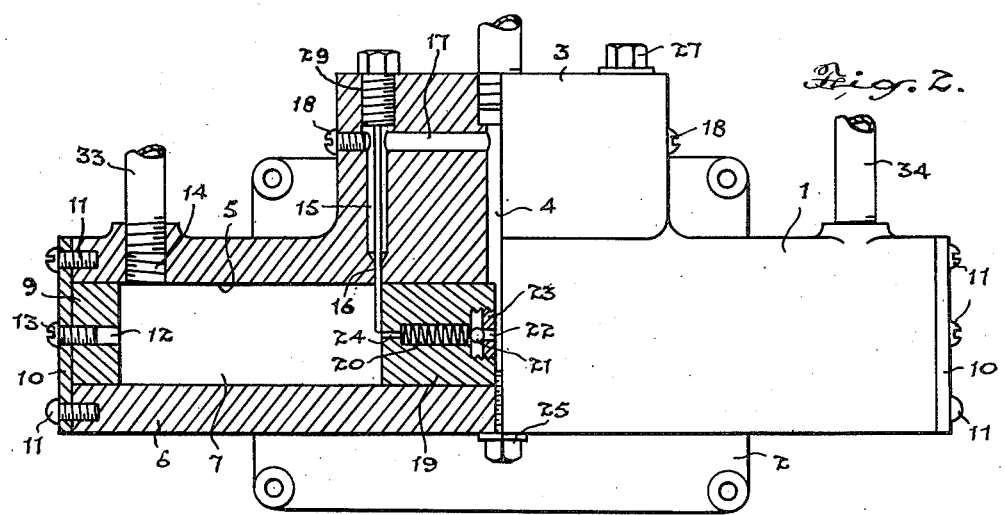
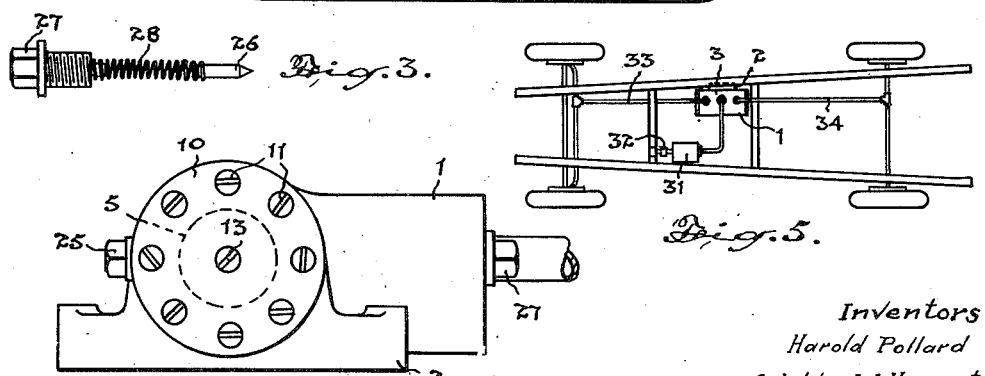
Inventors
Harold Pollard
Crichton W. Haggart
by Douglas S. Johnson Patented Jan. 30, 1951

2,539,970

UNITED STATES PATENT OFFICE 2,539,970

SAFETY CONTROL FOR HYDRAULIC BRAKE SYSTEMS

Harold Pollard, Toronto, Ontario, and Crichton W. Haggart, Kapuskasing, Ontario, Canada, assignors of thirty per cent to John C. Urquhart, Toronto, Ontario, Canada Application March 11, 1948, Serial No. 14,264

5 Claims. (Cl. 60—54.5)

This invention relates to a hydraulic brake system safety control of the type disclosed in United States Patent 2,402,748, June 25, 1946, which will function to automatically isolate a defective or leaking branch of the system while permitting the remainder of the system to operate normally, and the principal object of the invention is to provide a very much more simplified and improved form of hydraulic braking safety control device in the form of an extremely compact and rugged unit which can be very quickly and easily installed and will efficiently function to segregate or isolate a faulty branch yet will ensure even or equalized braking to be obtained with the faulty branch isolated, completely eliminating the danger of swerving or collision resulting from defective unequalized brakes.

A further important object of the invention is to provide an extremely simple form of safety control device which can be very readily and economically manufactured and will have a minimum of moving parts and the minimum of frictional operational losses.

A further important object is to provide a safety device which will be extremely easy to bleed without the use of special connections, greatly reducing time for installation or for replacement of a faulty branch.

A still further object is to provide a safety device which will require the minimum of attention resulting in extremely low maintenance costs.

The principal feature of the invention consists in forming a unitary block with a central bore in communication with the master cylinder of a hydraulic brake system providing the block with a pair of laterally extending cylindrical passages intersecting the central bore, one of the passages communicating adjacent its outer end with the front set of wheel cylinders of the brake system, the other passage communicating with the rear set of wheel cylinders, and providing valved relief passages in the block communicating with the central bore and the interior of the lateral passages adjacent their inner ends, the lateral passages having piston valves reciprocably arranged therein and adapted to seal the lateral passages at the outward end of their travel and to uncover the valved passages at the inward end of their travel.

A further important feature consists in providing a communication between the lateral passages and the wheel cylinders through openings in the peripheral wall of the passages to be closed by the periphery of the pistons and closing the outer ends of said lateral passages by plugs having stud-closed openings therethrough.

A further important feature consists in providing removable spring-actuated valves in the valved relief passages to permit the valves to be removed and the passages used for bleeding the system.

A still further feature consists in providing the piston valves with axial valve-controlled passages to accommodate slight operational fluid losses or expansions, the passages being sealed by the end closure plugs of the lateral passages when the piston valves are at the outward end of their travel.

In the accompanying drawing,

Figure 1 is a vertical mid-sectional view of my safety control unit showing the piston valves in an intermediate position of their travel.

Figure 2 is a part elevational part mid-sectional view of my control showing the piston in one of the lateral passages at the innermost point of its travel and the valve removed from the relief passage to permit the one branch of the system to be bled.

Figure 3 is an elevational view of the valve unit removed from the relief passage of Figure 2.

Figure 4 is an end view of the device of Figures 1 and 2.

Figure 5 is a diagrammatic plan view of the chassis of a motor vehicle showing the application of my invention thereto.

With reference to the accompanying drawing, it will be seen that my control device is incorporated in a single block 1 of generally T form and having a mounting base 2.

In the body portion 3 of the block is a central bore 4 which communicates at its inner end with an enlarged bore 5 extending through the head portion 6 of the block. This bored head portion 6 of the block is of cylindrical shape in cross section and forms a pair of laterally extending cylinders 7 and 8 arranged in aligned and opposing relation and communicating with the central bore 4.

The outer ends of these cylinders are closed by plugs 9 fitting within the enlarged bore 5 and secured to discs 10 held to the cylinder ends by the screws 11.

Extending centrally through the discs and plugs 9 are openings 12 which are normally closed by screws or studs 13.

Formed in the peripheral wall of each of the cylinders 7 and 8 adjacent to the inner face of the plug 9 is a threaded outlet 14, while communicating with the bore 5 thereof adjacent to the inner end of the cylinder is a passage 15 extending parallel to the central bore 4 through the body of the block and terminating in a reduced diameter portion 16.

A small transverse bore 17 extending through the block body portion 3 and parallel to the bore 5 is arranged to intersect the passages 15 and the central bore 4, providing communication between the central bore and the passages. The outer ends of the bore 17 are closed by suitable screws or studs 18.

Within each of the laterally extending cylinders 7 and 8 is arranged a piston 19 formed with an axial recess 20 housing a spring-held ball check valve 21 adapted to normally seat against and close an opening 22 in the ferrule 23 threaded into the inner end of the piston.

A small bleed orifice 24 in axial alignment with the recess 20 and ferrule 23 provides communication between the recess 20 and the interior of the cylinder through the inner end of the piston.

It will be seen on reference to Figure 2 that the spacing of the passages 15 from the central bore 4 and the size of the pistons are such that when the pistons are moved to the inward end of their travel as limited by the stop screw or stud 25 projecting into the bore 5 the reduced diameter portion 16 of the passages will be uncovered by the pistons and will be in communication with the interior of the cylinders.

Arranged in each of the passages 15 is a valve unit shown in Figure 3 which comprises the tapered or needle valve 26 which is held by the coil compression spring 28. When this valve unit is inserted into the passage 15 and the screw or bolt 27 is threaded into the screw-threaded mouth 29 of the passage the spring 28 will force the valve 26 down into the reduced diameter portion 16 of the passage 15. These valves 26 permit equalization of the fluid pressure on opposite sides of the pistons in the event expansion takes place in the fluid in the branches leading from the cylinders 7 and 8 as hereinafter explained.

If desired the bolt may have a grooved extension to receive the end of the screw or stud 18 forming a positive lock against removal of the valve unit.

In the application of my safety control to the normal hydraulic braking system of a vehicle, the central bore 4 of the block is connected to the master cylinder 31 of the hydraulic system, as shown in Figure 5. Fluid is thus forced from the master cylinder through the usual operating brake pedal 32 into the central bore 4 to actuate the pistons 19.

As shown, one of the piston cylinders 7 is connected through the hydraulic lead 33 with the front wheel braking motors, not shown, of the vehicle, while the other cylinder 8 is connected through the conduit or hydraulic lead 34 to the rear wheel brake motors, the conduits or leads 33 and 34 threading into the cylinder outlets 14.

Thus in operation with the system free of air and full of fluid pressure from the brake pedal 32 will move the pistons 19 outwardly in their cylinders, forcing fluid into the wheel brake motors to effect the braking of the vehicle.

In the event there is a slight operational loss of fluid in one of the branches of the systems, say in the branch feeding the front wheel brake motors, there will be an unbalance between the fluid pressures acting on the inner and outward ends of the piston operating in the cylinder connected to that branch through the hydraulic lead 33, the greater pressure being against the inner face of the piston. This difference of pressure will move the ball check valve 21 against the spring to uncover the opening 22 in the ferrule, permitting a small drain of fluid through the piston and out the axial bleed orifice 24.

In the event that the branch suffers more than a slight loss of fluid the piston operating in the cylinder connected with the branch will, upon fluid pressure through the central bore 4, move outwardly to the end of its cylinder, closing the outlet 14 shutting off fluid supply to the branch. At the same time the outer end or face of the piston will engage the inner face of the plug 9 and the bleed orifice 24 will be closed.

With the one branch of the system shut off by the peripheral wall of the piston operating in the cylinder connected with that branch it will be seen that the other branch can operate in the normal fashion and proper braking at the wheels connected with the operative branch will occur.

It is extremely important to note that, with my control unit when one of the hydraulic leads or branch 33 or 34 develops a leak, the piston operating in the cylinder connected with the branch will cut off braking fluid to both wheels of the branch so that when the brakes are applied only the wheels of the remaining functioning branch will be effected and equalized even braking will be obtained. That is, the brakes will be applied either to all four wheels or to the two front wheels or to the two rear wheels but never to one of the front or rear wheels only.

In the event that expansion takes place in the fluid in one of the branches of the system there will be an increase of pressure on the inner face of the piston operating in the cylinder connected to that branch, causing the piston to move inwardly until it reaches the stop 25. This movement of the piston will uncover the passage 15 connecting with the cylinder, and the fluid from the cylinder can then, by lifting the valve 26 against its spring 28, flow through the reduced passage portion 16, passage 15 and transverse bore 17 back into the central bore 4, equalizing the pressure of the system.

It will be understood of course that it is essential in placing the hydraulic system in operation that the system be properly bled to remove all the air therefrom and to ensure that all passages and ports are filled with fluid.

The importance of my control device is greatly enhanced by the facility with which this bleeding may be accomplished. Consider the bleeding of the branch connected to the cylinder 7. The screw or stud 13 is removed from the opening 12 and the wire or suitable tool is inserted into the cylinder 7, pushing the piston 19 back against its stop 25. Then by removing the bolt or screw 27 the valve assembly in the passage 15 communicating with the cylinder 7 is removed. A suitable wire or tool is then projected down the passage 15 to project into the bore of the cylinder 7 to hold the piston in its innermost position against the stop. The screw 13 is then replaced after the wire used in pushing the piston into position is removed. Then simply by introducing the fluid into the central bore 4 it will flow through the piston and out the bleed orifice 24, expelling air from the piston recess 20 and it will also flow through the passage 15 to fill the interior of the cylinder 7 and the hydraulic lead 33 connected therewith and into the wheel brake mechanisms connected with the lead 33, these wheel brake mechanisms being arranged to bleed so that the air forced before the fluid is expelled therefrom.

Following evidence of the completely filled branch as indicated by the presence of fluid flowing from the wheel mechanisms bleeding orifices the wire or tool in the passage 15 is withdrawn and the valve unit replaced therein. The small displacement of fluid by the wire or tool holding the piston will permit the piston, when the tool is withdrawn, to move into the cylinder where it will take up a position adjacent the central portion of the cylinder.

Similarly the remaining branch can be quickly bled and the filling of the branch can be accomplished in an extremely short interval.

It will be noted that no special connections from one part of my device to the other are necessary during the bleeding operation which can be carried out by anyone familiar with the normal hydraulic system.

The simplicity of my device is of prime importance in that it can be very economically manufactured and easily installed and serviced without making the cost of the system prohibitive.

In the manufacture it will be seen that it is merely necessary to provide the T-shaped block with a central bore, enlarged transverse bores intersecting the central bore and forming the piston passages, providing a pair of passages parallel with the central bore and terminating in their reduced portion 16 in communication with the lateral piston passages, then providing a transverse bore which communicates with the central bore and parallel passages and forming outlets in communication with the piston passages.

This whole procedure can be accomplished in the minimum of operations, and the valve units, pistons, closure discs and closure screws or studs can be readily located in position to provide an extremely sturdy or rugged unit having a minimum of operating parts requiring a minimum of maintenance and servicing.

In the event that defects should occur at any time in the piston assembly or valve assembly in the relief passages 15 the assemblies can be quickly removed and replaced without requiring removal of the unit from its installation.

From the foregoing it will therefore be appreciated that my device is extremely simple and can be economically manufactured and will function effectively to isolate defective hydraulic branches, while at the same time ensuring equalized braking and therefore comprising an extremely important addition to the existing hydraulic braking systems.

What we claim as our invention is:

1. In a safety device for hydraulic pressure systems the combination with a master cylinder and branch hydraulic leads, of a unitary block having a bore in communication with the master cylinder and having cylindrical passages communicating at their inner ends with said bore and adjacent their outer ends with said branch leads, relief passages formed in said block leading from said bore and communicating with the interior of said cylindrical passages adjacent their inner end, valves in said passages permitting one-way fluid flow only out of said cylindrical passages, pistons reciprocably arranged in said block in said cylindrical passages to seal the cylindrical passages at the outward end of their travel and to uncover said relief passages at the inward end of their travel fluid-compensating passages formed through said pistons and sealed with said pistons at the outward end of their travel, and valve means arranged in said latter fluid-compensating passages and permitting one-way fluid flow only through said valve towards the outer ends thereof.

2. A safety device for a vehicle hydraulic pressure braking system, comprising a unitary block having a central bore for communcation with a master cylinder and laterally extending cylindrical passages opening at their inner ends to the central bore and each having an outlet in its peripheral wall adjacent the outer end for communication with a vehicle wheel brake mechanism, relief passages formed in said block leading from the central bore and communicating with the lateral cylindrical passages adjacent their inner ends, valves arranged in said relief passages and permitting one-way fluid flow from said cylindrical passages to said bore, and pistons reciprocably mounted in said block in said lateral passages and arranged to seal said outlets at the outer end of their travel and to uncover said valved relief passages at the inner end of their travel, said pistons each being formed with an orifice leading from the inner end and terminating in a bleed orifice the outer end of which is adapted to be sealed against the end of the piston passage at the outward end of the piston travel, and valve means arranged in the piston orifices to prevent backflow of pressure through the bleed orifice.

3. In a safety device for vehicle hydraulic pressure braking systems, the combination with a master cylinder and a pair of branch hydraulic leads leading to the vehicle front and rear wheel braking motors respectively, of a block having a central bore adapted to communicate with the master cylinder and a pair of laterally extending cylindrical passages communicating at their inner ends with said central bore and having closed outer ends, outlets in the peripheral walls of said lateral passages adjacent their outer ends and connected with said branch hydraulic leads, passages in said block leading from the said bore to the interior of said lateral passages adjacent their inner end, valves arranged in said passages and permitting one-way fluid flow from said lateral passages to said bore, and pistons arranged in said lateral passages and adapted to close said outlets at the outward ends of their travel and to uncover said valved passages at the inward end of their travel, said pistons having axially arranged bleed passages formed therein closed by contact with said closed outer ends of said lateral passages in the outermost piston positions, valves arranged in said bleed passages and in intermediate piston positions permitting restricted one-way fluid flow from the inner piston ends to compensate for slight operational fluid losses in said branch leads.

4. A device as claimed in claim 3 in which a stop is provided to limit inward movement of the pistons and plug-closed openings are provided in the closed ends of said lateral passages to permit the insertion of means to hold the pistons at their innermost position against said stop to facilitate bleeding of the system through said valved passages.

5. In a safety device for vehicle hydraulic pressure braking systems, the combination with a master cylinder and branch hydraulic leads to the front and rear wheel braking motors respectively, of a block having a central bore and laterally extending cylinder portions in communication with the central bore at their inner ends, discs provided with plug-closed openings therethrough closing the outer ends of said cylinder portions, an outlet in the wall of each of said cylinder portions and communicating with one of the branch hydraulic leads, relief passages extending inwardly from the bored face of said block substantially parallel to said central bore and intersecting said lateral cylinders adjacent their inner ends, spring-operated valves removably mounted in said relief passages, a transverse passage intersecting and providing communication between said relief passages and said central bore, pistons reciprocably arranged in said lateral cylinders and adapted to close said outlets when moved to their outermost positions and to uncover said relief passages at their innermost positions, restricted fluid compensating passages formed in said pistons and sealed with said pistons in their outermost position by said discs, and valve means permitting one-way fluid flow through said latter passages to said branches with said pistons moved from their outermost positions.

HAROLD POLLARD.
CRICHTON W. HAGGART.

REFERENCES CITED

The following references are of record in the file of this patent:

UNITED STATES PATENTS

| Number | Name | Date |
|---|---|---|
| 1,721,213 | Frock | July 16, 1929 |
| 1,786,438 | Linderman | Dec. 30, 1930 |
| 2,128,853 | Roen | Aug. 30, 1938 |
| 2,249,227 | Press | July 15, 1941 |